United States Patent
Hefner, Jr.

(10) Patent No.: US 10,472,467 B2
(45) Date of Patent: Nov. 12, 2019

(54) POLYMERS HAVING INTRINSIC MICROPOROSITY INCLUDING SUB-UNITS WITH TROGER'S BASE AND SPIROBISINDANE MOIETIES

(71) Applicant: Dow Global Technologies LLC, Midland, MI (US)

(72) Inventor: Robert E. Hefner, Jr., Rosharon, TX (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 15/571,080

(22) PCT Filed: Jul. 31, 2017

(86) PCT No.: PCT/US2017/044605
§ 371 (c)(1),
(2) Date: Nov. 1, 2017

(87) PCT Pub. No.: WO2018/057119
PCT Pub. Date: Mar. 29, 2018

(65) Prior Publication Data
US 2019/0211151 A1 Jul. 11, 2019

Related U.S. Application Data

(60) Provisional application No. 62/396,959, filed on Sep. 20, 2016.

(51) Int. Cl.
C08G 73/02 (2006.01)
B01D 71/60 (2006.01)
C08J 3/24 (2006.01)

(52) U.S. Cl.
CPC ......... *C08G 73/0273* (2013.01); *B01D 71/60* (2013.01); *C08J 3/24* (2013.01)

(58) Field of Classification Search
CPC .... C08G 73/0694; B01D 71/62; B01D 71/72; B01D 2325/02; C08J 3/24; C08J 9/36; C08J 2205/044; C08J 2379/08
See application file for complete search history.

(56) References Cited

U.S. PATENT DOCUMENTS

| | | | |
|---|---|---|---|
| 5,629,084 A | 5/1997 | Moya | |
| 7,410,525 B1 | 8/2008 | Liu et al. | |
| 7,485,173 B1 | 2/2009 | Liu et al. | |
| 7,690,514 B2 | 4/2010 | McKeown et al. | |
| 7,758,751 B1 | 7/2010 | Liu et al. | |
| 7,771,857 B2 | 8/2010 | Fritsch et al. | |
| 7,806,962 B2 | 10/2010 | Liu et al. | |
| 7,943,543 B1 | 5/2011 | Liu et al. | |
| 8,048,198 B2 | 11/2011 | Liu et al. | |
| 8,056,732 B2 | 11/2011 | McKeown et al. | |
| 8,132,677 B2 | 3/2012 | Liu et al. | |
| 8,575,414 B2 | 11/2013 | Liu et al. | |
| 8,613,362 B2 | 12/2013 | Liu et al. | |
| 8,623,928 B2 | 1/2014 | Du et al. | |
| 8,686,104 B2 | 4/2014 | Du et al. | |
| 8,809,488 B2 | 8/2014 | Du et al. | |
| 8,814,982 B2 | 8/2014 | Liu et al. | |
| 8,894,859 B2 | 11/2014 | Livingston et al. | |
| 8,969,628 B2 | 3/2015 | Priske et al. | |
| 9,018,270 B2 | 4/2015 | McKeown et al. | |
| 9,126,185 B2 | 9/2015 | Laskoski | |
| 9,238,202 B2 | 1/2016 | Liskey et al. | |
| 2004/0198587 A1 | 10/2004 | McKeown et al. | |
| 2006/0246273 A1 | 11/2006 | McKeown et al. | |
| 2007/0209505 A1 | 9/2007 | Liu et al. | |
| 2009/0031897 A1 | 2/2009 | Liu et al. | |
| 2009/0120875 A1 | 5/2009 | Liu et al. | |
| 2009/0155464 A1 | 6/2009 | Liu et al. | |
| 2010/0130634 A1 | 5/2010 | Fritsch | |
| 2012/0157743 A1 | 6/2012 | Liu et al. | |
| 2012/0273421 A1 | 11/2012 | Perry et al. | |
| 2013/0085191 A1 | 4/2013 | Laskoski | |
| 2013/0112619 A1 | 5/2013 | Livingston et al. | |
| 2013/0146538 A1 | 6/2013 | Liu et al. | |
| 2013/0172433 A1* | 7/2013 | McKeown | B01D 71/62 521/25 |
| 2013/0217799 A1 | 8/2013 | Visser et al. | |
| 2013/0247756 A1 | 9/2013 | Li et al. | |

(Continued)

FOREIGN PATENT DOCUMENTS

KR 20150027605 3/2015
WO 2005113121 12/2005
(Continued)

OTHER PUBLICATIONS

Grogojo et al., Adv. Funct. Mater. 2014, 24, 4729-4737.
Fritsch et al., Journal of Membrane Science 401-402 (2012) 222-231.
Xiaohua Ma et al., Synthesis and Gas Transport Properties of Hydroxyl-Functionalized Polyimides with Intrinsic Microporosity, Macromolecules, vol. 45, No. 9 (May 8, 2012).

(Continued)

*Primary Examiner* — Shane Fang

(57) ABSTRACT

A polymer comprising a sub-unit or repeating unit including a spirobisindane moiety and Troger's base moiety linked together by way of a linking group (L) wherein the linking group (L) is represented by Formula III:

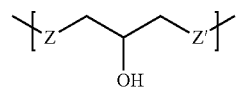

wherein Z and Z' are independently selected from an ether and ester functional group.

9 Claims, No Drawings

(56) References Cited

U.S. PATENT DOCUMENTS

| | | |
|---|---|---|
| 2013/0267616 A1 | 10/2013 | McKeown et al. |
| 2014/0251897 A1 | 9/2014 | Livingston et al. |
| 2014/0255636 A1 | 9/2014 | Odeh |
| 2015/0148439 A1 | 5/2015 | Eddaoudi et al. |
| 2015/0165383 A1 | 6/2015 | Liskey et al. |
| 2015/0239806 A1 | 8/2015 | Wendland |

FOREIGN PATENT DOCUMENTS

| | | |
|---|---|---|
| WO | 2012035327 | 3/2012 |
| WO | 2012035328 | 3/2012 |
| WO | 2014186108 | 11/2014 |
| WO | 2015018576 | 2/2015 |
| WO | 2015095026 | 6/2015 |
| WO | 2015095034 | 6/2015 |
| WO | 2015095044 | 6/2015 |
| WO | 2015129925 | 9/2015 |
| WO | 2016148869 | 9/2016 |
| WO | 2016161367 | 10/2016 |
| WO | 2016195977 | 12/2016 |
| WO | 2016206008 | 12/2016 |
| WO | 2017030450 | 2/2017 |
| WO | 2017091357 | 6/2017 |

OTHER PUBLICATIONS

Xiaohula Ma et al., Novel Spirobifluorene and Dibromospirobifluorene-based Polyimides of Intrinsic Microporosity for Gas Separation Applications, Macromolecules, vol. 46, No. 24, (Dec. 23, 2013).

Fu Yun Li et al., High-Performance Thermally Self-Cross-Linked Polymer of Intrinsic Microporosity (PIM-1) Membranes for Energy Development, Macromolecules, vol. 45, No. 3, (Feb. 14, 2012).

* cited by examiner

POLYMERS HAVING INTRINSIC MICROPOROSITY INCLUDING SUB-UNITS WITH TROGER'S BASE AND SPIROBISINDANE MOIETIES

FIELD

The invention relates to polymers having intrinsic microporosity, particularly polymers including sub-units including Troger's base and spirobisindane moieties. The subject polymers have particular utility as membranes useful in gas and liquid separations.

INTRODUCTION

Polymers with intrinsic microporosity (PIMs) are characterized by having macro-molecular structures that are both rigid and contorted so as to have extremely large fractional free volumes. Examples include poly(1-trimethylsilyl-1-propyne) (PTMSP), poly(4-methyl-2-pentyne) (PMP) and polybenzodioxane (PIM-1). Because of their exceptional free volume, all are extremely permeable. See: Baker, Membrane Technology and Applications, 3$^{rd}$ ed., (2012), and Polymers of Intrinsic Microporosity, Enc. Polymer Sci. & Tech., (2009)—both by John Wiley & Sons Ltd. See also: WO2005/113121; US2004/01985587; US2013/0146538; US2013/0172433; US2013/0267616; US2014/0251897; U.S. Pat. Nos. 9,018,270; 8,623,928; 8,575,414; 8,056,732; 7,943,543; 7,690,514 and 7,410,525 which are incorporated herein in their entirety. By way of example, US2014/0251897 describes a thin layer composite membrane including a thin selective layer of a networked microporous polymer having intrinsic microporosity formed via an interfacial polymerization of monomers having concavity (e.g. spirobisindanes, bisnapththalenes, ethanoanthracenes). Similarly, U.S. Pat. No. 9,018,270 describes an interfacial polymerization technique for preparing thin film composite membranes including a thin layer of PIMs. In one embodiment, the polymer includes a repeating unit including a Troger's base moiety, e.g.

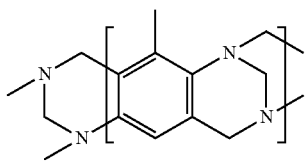

See also D. Xin et al., "Troger's base-functionalised organic nanoporous polymer for heterogeneous catalyst," Chem Comm (2009) pp. 970-972, which provides a description of the preparation of so-called Troger's base nanoporous polymers and their use as catalyst in the addition reaction of diethyl zinc to an aromatic aldehyde.

SUMMARY

The present invention includes polymers (and copolymers—collectively referred to herein as "polymers") having intrinsic microporosity and corresponding methods for making and using the same. The subject polymers include sub-units (and preferably repeating units) having both a Troger's base and spirobisindane moiety. The Troger's base moiety and spirobisindane moiety are preferably linked by way of a "linking group" comprising an alkylene group having from 3 to 5 carbon atoms with an ether or ester functional group providing a linking bond. A representative repeating unit is provided below.

In a preferred class of embodiments, the invention includes a polymer including a sub-unit (or preferably repeating unit) wherein the Troger's base moiety is represented by Formula I

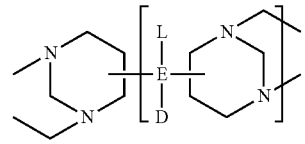

Formula I wherein E is an arylene group comprising from 1 to 4 rings (preferably phenylene); L is a linking group to a spirobisindane moiety and D is selected from: hydrogen, hydroxyl, nitrile, nitro, alkyl (e.g. 1 to 4 carbon atoms but preferably methyl), alkoxy (e.g. 1 to 4 carbon atoms but preferably methoxy), hydroxyalkyl (e.g. 1 to 4 carbon atoms but preferably OH—CH$_2$—); carboxylic acid, sulfonic acid and their corresponding salts or esters. Preferred subclasses of Troger's base moieties are represented by Formula Ia and Ib:

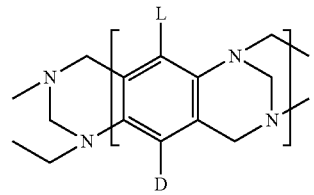

Formula Ia

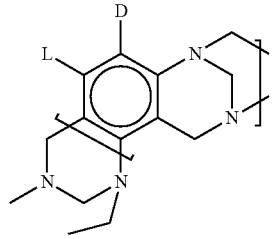

Formula Ib

The spirobisindane moiety is represented by Formula II:

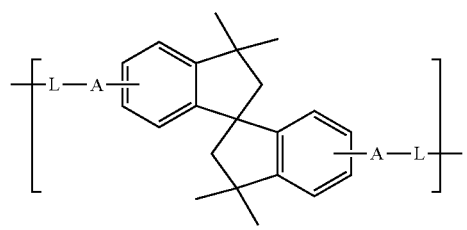

wherein A is independently selected from a fused ring structure (preferably including from 1 to 4 rings, e.g. an arylene group such phenylene) or is not present, and L is a linking group to a Troger's base moiety.

In preferred embodiments, L is independently selected from an alkylene group preferably comprising from 2 to 5 carbon atoms and including at least two functional groups selected from: ester and ether. For example, in a preferred set of embodiments, each instance of L is independently represented by Formula III:

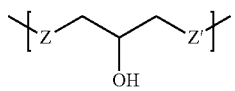

wherein Z and Z' are independently selected from an ether and ester functional group. In another preferred embodiment, the invention includes polymers comprising the reaction product of an epoxy functional spirobisindane monomer and Troger's base monomers, oligomers, copolymers or polymers substituted with constituents (e.g. hydroxyl, carboxylic acid) that react with epoxy groups.

In additional embodiments, the invention includes thin films, coatings and membranes made using the subject polymers, including network forms of the polymers useful in the formation of such films, coatings and membranes.

In preferred embodiments, the subject polymers address one or more of the shortcomings associated with known PIMs technology, e.g. increased membrane durability, rejection, fouling resistance, rigidity and dimensional stability leading to better maintenance of nanoporous structure under varied end use conditions, better tolerance toward functional groups needed to enhance selectivity, improved processability and fabrication, higher glass transition temperature, higher thermal stability, higher thermooxidative stability, increased moisture resistance, increased resistance to acids and bases, and organic solvent resistance.

DETAILED DESCRIPTION

In a preferred embodiment, the subject polymers possess intrinsic microporosity. The term "intrinsic microporosity" refers to a polymer having a continuous network of interconnected intermolecular voids which form as a direct consequence of the shape and rigidity of at least a portion of the component monomers of the polymer. The term "microporous" refers to a material having an interconnected system of voids of a diameter less than 2 nm as defined by IUPAC. Preferably, the subject polymers have average pore diameters of from 0.2 to 20 nm as determined by standard bubble point test (e.g. ASTM F316-03 (2011)). The polymers also have high apparent surface areas (e.g. greater than 100 $m^2/g$, and more preferably greater than 150 $m^2/g$ as determined to by the Brunauer-Emmett-Teller (BET) method.

In several embodiments, the subject polymers are network polymers. The term "network" is defined as a covalently crosslinked 3-dimensional polymer network in contrast to a "non-network polymer" or linear polymer which does not having a covalently crosslinked 3-dimensional network.

Membranes made using the subject polymers may be formed by conventional techniques, e.g. casting, in-situ polymerization upon a porous support, dip coating and subsequent polymerization onto a porous support, etc. Such membranes are useful in separations based upon the relative rates of mass transfer of different species across a membrane. A driving force, typically a pressure or a concentration difference, is applied across the membrane so that selected species preferentially pass across the membrane. The membranes may be used for purification, separation or adsorption of a particular species (e.g. salts, organics, ionic species) in the liquid (e.g. aqueous, organic) or gas phase. In particular, the subject membranes exhibit excellent pH and solvent stability and as a consequence, are suitable for use in a wide range of applications including: gas separation, ion exchange, water softening, water purification, ultra-high purity water production in applications such as electronics, metal separation including rare earths, catalysis, remediation of mining waste water, uranium processing, leach mining, and processing of liquids in dairy, sugar, fruit juice and pharmaceuticals and ethanol production in a continuous fermentation/membrane pervaporation system. In specific embodiments, the subject polymers include hydrophilic functional groups, e.g. carboxylic acid, that provide improved selectivity in many applications.

The subject membrane is not particularly limited to a specific type, construction or application. For example, the subject polymers may be fabricated into to flat sheet (film), tubular and hollow fiber configurations that find utility in a variety of applications including gas separations, pervaporation, forward osmosis (FO), reverse osmosis (RO), nano filtration (NF), ultra filtration (UF), micro filtration (MF) and pressure retarded fluid separations. One preferred design is a thin film composite structure. See for example WO 2005/113121 and US2014/0251897. With a thin film composite design a "thin film" of the subject polymer is formed upon a support using well known techniques, e.g. dip coating, casting, etc., a solution of the subject polymer and conducting a phase separation (e.g. via quench, cooling, etc.) to form the desired porosity. The resulting membrane may be further subject to heating to facilitate crosslinking. By way of a more specific example, the composite membrane may include a bottom layer (back side) of a nonwoven backing web (e.g. PET scrim), a middle layer of a porous support having a typical thickness of about 25-125 µm and top layer (front side) comprising a thin film polymer layer having a thickness typically less than about 1 micron, e.g. from 0.01 micron to 1 micron but more commonly from about 0.01 to 0.1 µm. The porous support is typically a polymeric material having pore sizes which are of sufficient size to permit essentially unrestricted passage of permeate but not large enough so as to interfere with the bridging over of a thin film polymer layer formed thereon. For example, the pore size of the support preferably ranges from about 0.001 to 0.5 µm. Non-limiting examples of porous supports include those made of: polyetheretherketone, polysulfone, polyethersulfone, polyimide, polyamide, polyetherimide, polyacrylonitrile, crosslinked polyacrylonitrile, poly(methyl methacrylate), polyethylene, polypropylene, and various halogenated polymers such as polyvinylidene fluoride. For most applications, the porous support provides strength but offers little resistance to fluid flow due to its relatively high porosity.

In one embodiment, the invention includes a polymer including a sub-unit (and more preferably a repeating unit) represented as follows:

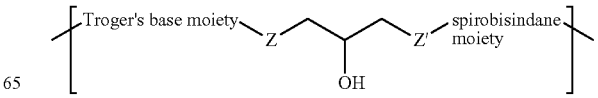

wherein Z and Z' are independently selected from an ether and ester functional group.

Troger's base compounds, such as those described in Angewandte Chemie International Edition, volume 50, issue 10, pages 2401-2404, 8 Feb. 2011 DOI: 10.1002/anie.201007162 and Prelog, V.; Wieland, P. (1944). "Über die Spaltung der Tröger'schen Base in optische Antipoden, ein Beitrag zur Stereochemie des dreiwertigen Stickstoffs", *Helvetica Chimica Acta* 27 (1): 1127-1134, (1944) may be employed in the present invention. A preferred subclass of Troger's base moieties is represented by Formula Ic along with its corresponding isomers (not shown):

Formula Ic

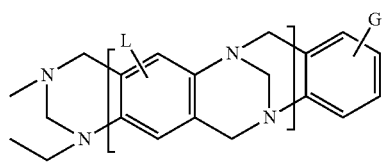

wherein G is selected from: carboxylic acid, sulfonic acid and their corresponding salts or esters; hydroxyl and hydrogen.

Spirobisindane monomers useful in the present invention may be represented by Formula II as shown above. A preferred ring structure is represented by Formula IIa (where A and A' of Formula II are both not present):

Formula IIa

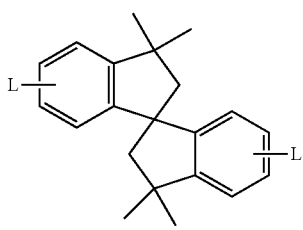

Spirobisindane monomers may be prepared using the methods described by Chen, W-F.; Lin, H-Y.; Dai, S. A.; Organic Letters, 6, 14, 2341-2343 (2004); Faler, G. R.; Lynch, J. C.; U.S. Pat. No. 4,701,566 (Oct. 20, 1987); Ito, M.; Iimuro, S.; U.S. Pat. No. 5,339,783 (Mar. 21, 1995); Curtis, R. F.; Lewis, K. O.; J. Chem. Soc., 418-421 (1962); Baker, W.; J. Chem. Soc., 1678-1681 (1934); Fisher, C. H.; Furlong, R. W.; Grant, M.; Journal of the American Chemical Society 58, 820-822 (1936); Baker, W.; Besly, D. M.; J. Chem. Soc., 1421-1424 (1939); Baker, W.; Besly, D. M.; J. Chem. Soc., 347-353 (1938), Ma, X; Swaidan, Y. B.; Zhu, Y.; Litwiller, E.; Jouiad, I. P.; Han, Y.; Macromolecules, 45, 3841-3849 (2012); Li, S.; Jo, H. J.; Han, S. H.; Park, C. H.; Kim, S.; Budd, P. M.; Lee, Y. M.; Journal of Membrane Science, 434, 137-147 (2013).

Preferred classes of polymers include a sub-unit (or repeating unit) represented by Formula IV:

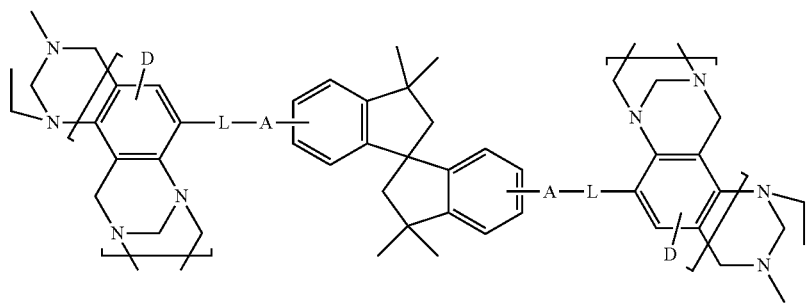

wherein for a given unit, each instance of A, and L need not be the same, and A, L and D are as defined above.

While not shown, a part or all of the nitrogen groups of the Troger's base moieties may be substituted (e.g. with a lower alkyl, e.g. methyl, ethyl, etc.) producing a cationic charge on said nitrogen atom which is associated with a corresponding anionically charged species.

The subject polymers may be prepared using known starting materials and techniques. In particular, preferred starting materials including Troger's base oligomers and polymers containing phenolic hydroxyl or carboxylic acid groups and diglycidyl ethers of spirobisindane monomers, e.g.

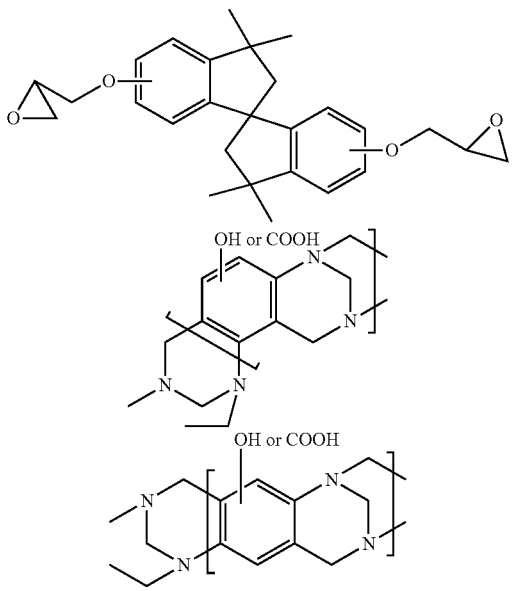

Spirobisindane monomers including glycidyl ether groups may be prepared using common synthetic techniques, e.g. Epoxidation of 3,3,3',3'-Tetramethyl-1,1'-spirobisindane-6,6'-diol:

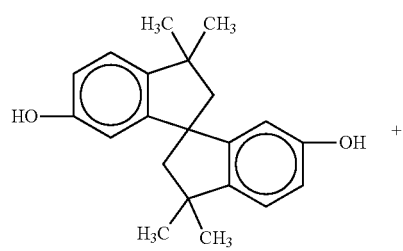
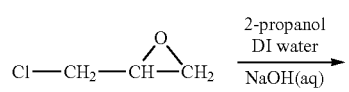
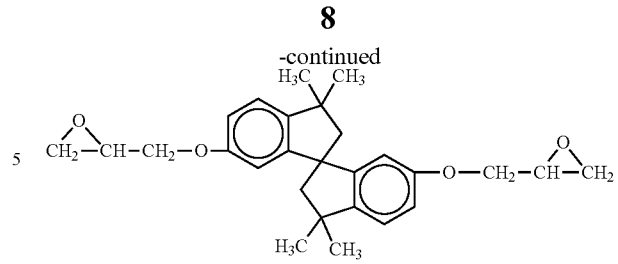

Several representative reaction pathways for preparing the subject polymers are provided below.

Reaction Pathway I: A representative example of the invention is prepared by combining the diglycidyl ether of 3,3,3',3'-tetramethyl-1,1'-spirobisindane-6,6'-diol and a phenyl terminated hydroxyl functional Troger's base polymer, followed by optional B-staging and thermosetting to produce a copolymer as depicted below.

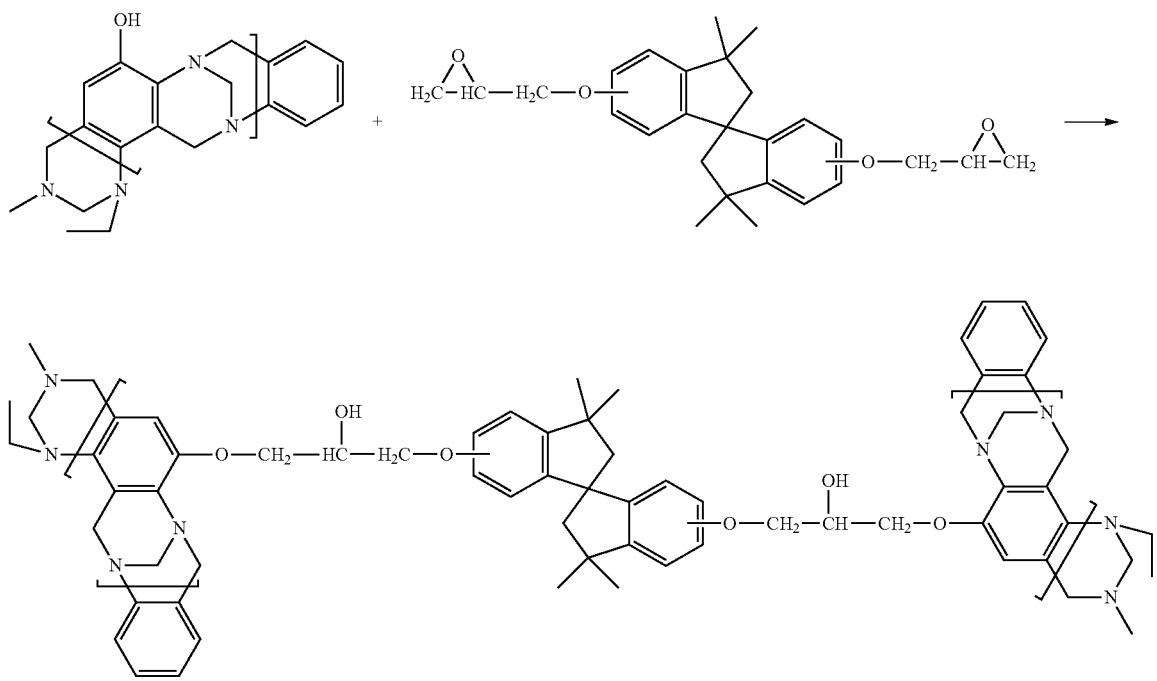

Reaction Pathway II: Another representative example of the invention is prepared by combining the diglycidyl ether of 3,3,3',3'-tetramethyl-1,1'-spirobisindane-6,6'-diol and a carboxylic acid functional Troger's base polymer, followed by optional B-staging and thermosetting to produce a copolymer as depicted below.

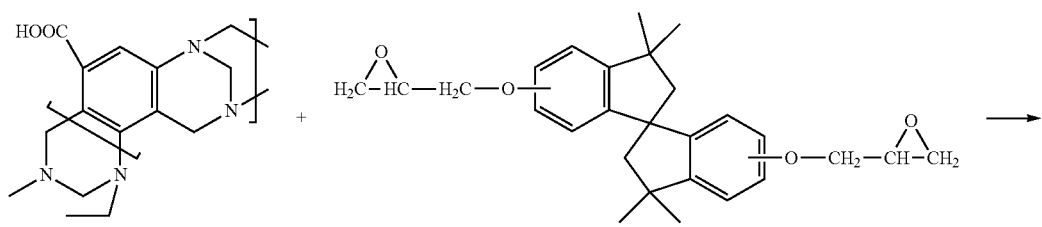

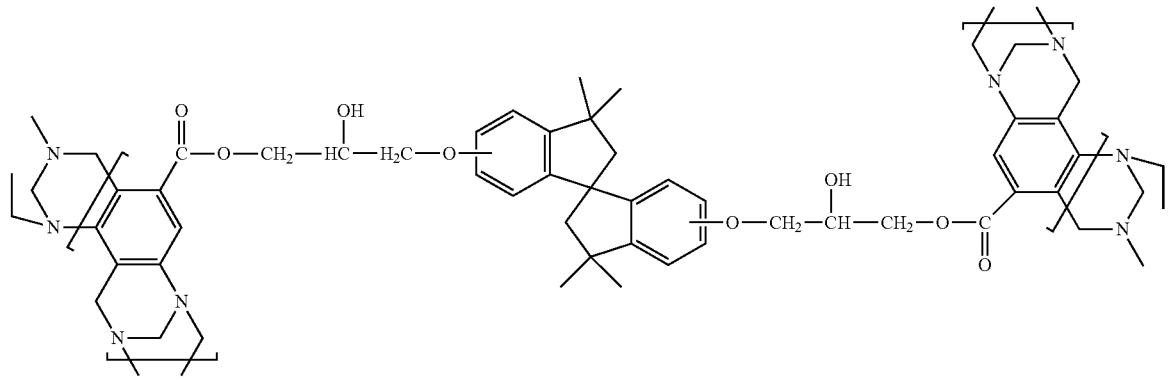

Reaction Pathway III: A representative example of the invention that would provide water soluble PIMs is prepared by combining the diglycidyl ether of 3,3,3',3'-tetramethyl-1,1'-spirobisindane-6,6'-diol and a hydroxyl functional and sulfonate functional Troger's base copolymer, followed by optional B-staging and thermosetting to produce a copolymer as depicted below. An exemplary synthesis of the Troger's base PIM involves condensation of 2,4-diaminophenol dihydrochloride and 2,4-diaminobenzenesulfonic acid and paraformaldehyde in trifluoroacetic acid followed by conversion of the sulfonic acid group to a sodium sulfonate group. The copolymerization with the diglycidyl ether of 3,3,3',3'-tetramethyl-1,1'-spirobisindane-6,6'-diol may require the use of an aprotic solvent, particularly N,N-dimethylformamide. Copolymerization in aqueous media may be performed, for example, as an emulsion.

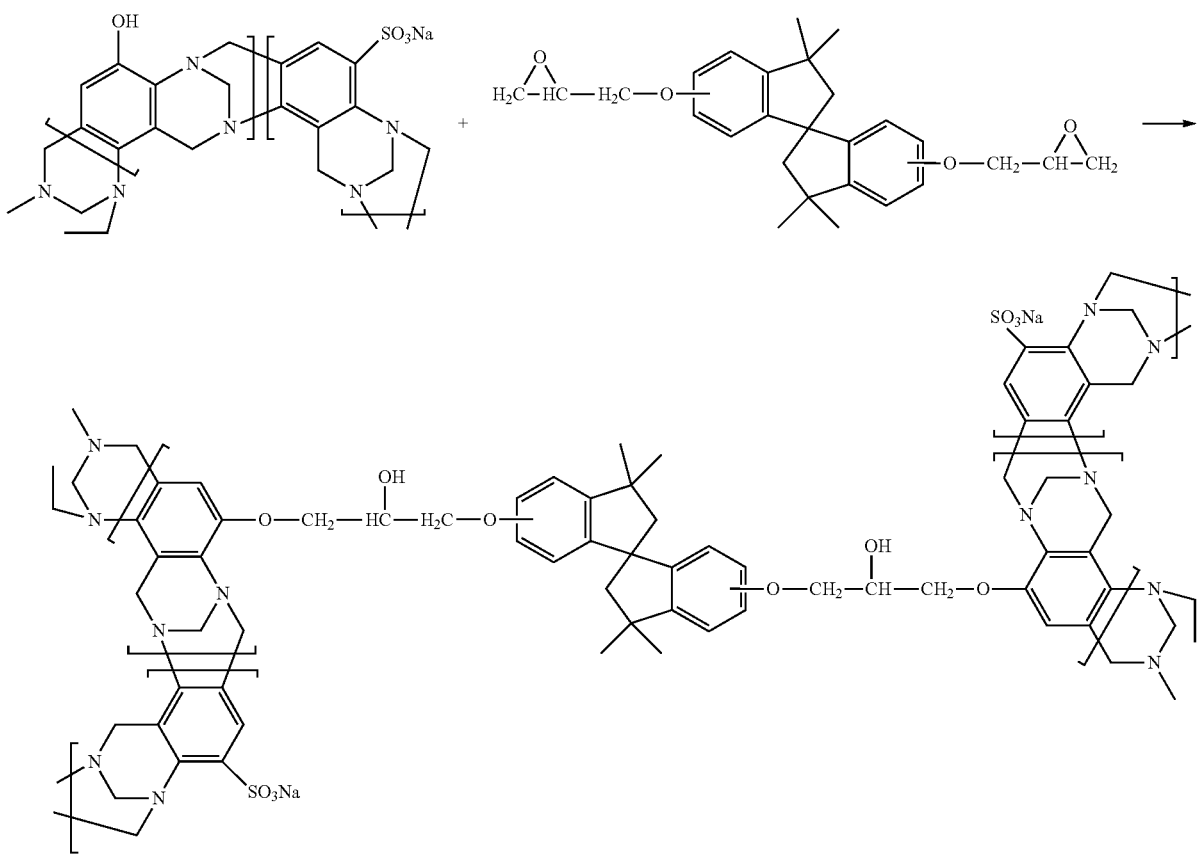

Reaction Pathway IV: A representative example of the invention that would provide water soluble PIMs is prepared by combining the diglycidyl ether of 3,3,3',3'-tetramethyl-1,1'-spirobisindane-6,6'-diol and a hydroxyfunctional Troger's base copolymer, followed by optional B-staging and thermosetting to produce a copolymer as depicted below. The quaternary salt structure may serve to self-catalyze reaction of the phenolic hydroxyl and epoxide groups but catalyst could be added if needed. Copolymerization in aqueous media may be performed, for example, as an emulsion.

cidyl ether of 6,6'-dihydroxy-1,1'-spirobisindane-3,3'-dione; the diglycidyl ether of 6,6'-dihydroxy-1,1'-spirobisindane-3-fluorene-3'-one; the diglycidyl ether of 6,6'-dihydroxy-1,1'-spirobisindane-3,3'-bisfluorene; the diglycidyl ether of 5,5'-dimethoxy-6,6'-dihydroxy-1,1'-spirobisindane-3,3'-bisfluorene; the diglycidyl ether of 5,5'-dimethoxy-6,6'-dihydroxy-3,3,3',3'-tetramethyl-1,1'-spirobisindane; the diglycidyl ether of 5,4'-dimethoxy-6,6'-dihydroxy-1,1'-spirobisindane; the tetraglycidyl ether of 3,3,3',3'-tetramethyl-1,1'-spirobisindane-4,6,4',6-tetrol; mixtures thereof and the like.

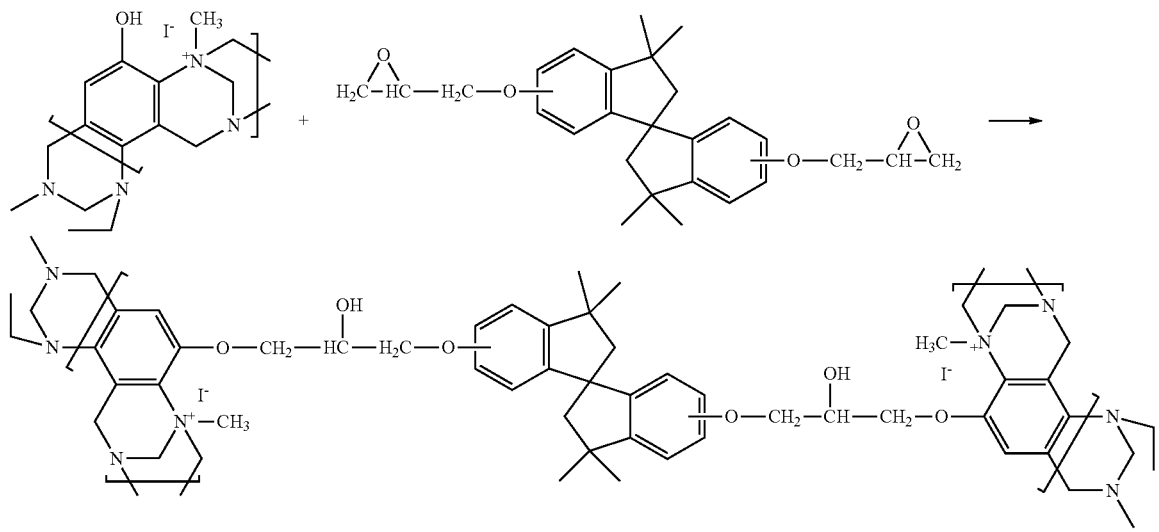

Reaction Pathway V: Another representative example of the invention is prepared by combining the diglycidyl ether of 3,3,3',3'-tetramethyl-1,1'-spirobisindane-6,6'-diol and a hydroxy functional Troger's base polymer, followed by optional B-staging and thermosetting to produce a copolymer as depicted below.

The curable compositions of (1) one or more epoxy resins containing spirocyclic fused ring structure with (2) one or more Troger's base compounds, oligomer, co-polymers and/or polymers which contain at least one epoxide reactive functional group may be particularly advantageous in a reaction to couple to the support and/or to another mem-

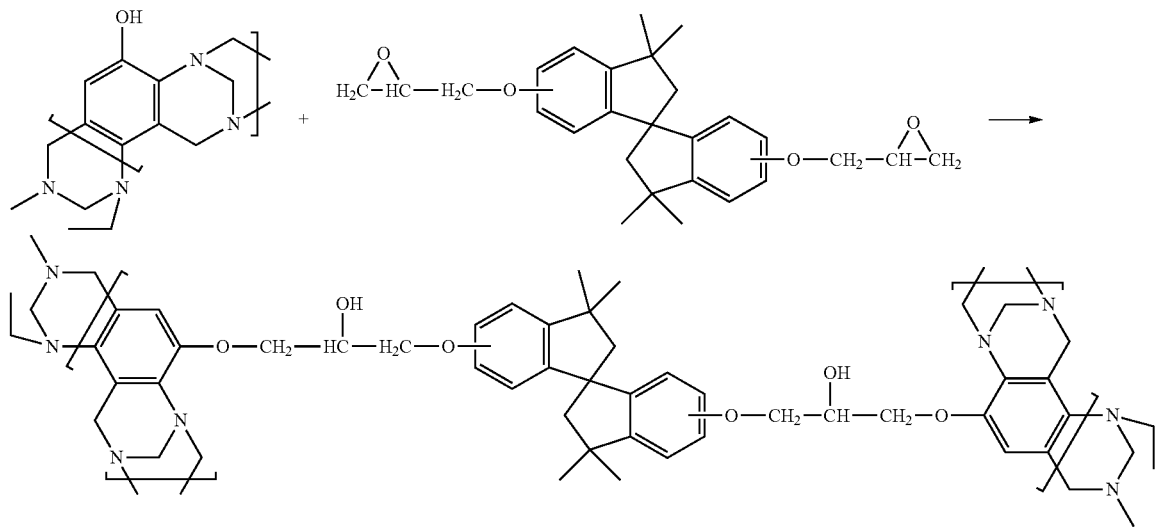

Other representatives of (1) one or more epoxy resin containing spirocyclic fused ring structure include the diglybrane layer, for example, in a thin film composite. In this embodiment, at least a portion of the epoxide groups react with groups present on the support and/or other membrane layer to form a covalent bond.

The subject polymers may include additional repeating units or branching, i.e. be formed via a copolymerization; however, the subject polymers preferably comprise at least 50 molar %, 75 molar % and more preferably at least 90 molar % of repeating units represented by Formula I (e.g. 50-100 molar %, 75-100 molar % and 90 to 100 molar % of the subject monomers). The various isomer structures which are possible are not shown in the formulas, for example, Formula I, but are intended to be included.

A number of variations of the polymer synthesis are useful for modifying the physical and mechanical properties of the polymer. These variations include structural changes in the comonomers employed and changes in the stoichiometric ratio of comonomers employed. Examples of structural changes in the comonomers employed include addition of one or more substituents, for example represented the "D" moiety in Formula I and the "G" moiety in Formula Ic, and variations of comonomers. Changes in the stoichiometric ratio of comonomers employed include: variations in equivalent ratio of comonomers used (can markedly change molecular weight and/or crosslink density), inclusion of additional comonomers.

B-staging or prepolymerization of copolymerizable mixtures of the spirobisindane containing epoxide groups and the Troger's base containing material can be accomplished by using lower temperatures and/or shorter curing times and/or reduced catalyst concentration. Curing of the thus formed B-staged (prepolymerized) product can then be accomplished at a later time or immediately following B-staging (prepolymerization) by increasing the temperature and/or curing time.

The invention claimed is:

1. A polymer comprising a sub-unit comprising a spirobisindane moiety and Troger's base moiety linked together by way of a linking group (L) wherein the linking group (L) is represented by Formula III:

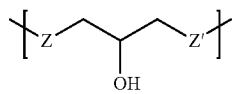

wherein Z and Z' are independently selected from an ether and ester functional group.

2. The polymer of claim 1 wherein the Troger's base moiety is represented by Formula I:

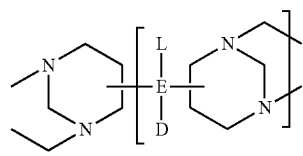

wherein E is an arylene group comprising from 1 to 4 rings; L is a linking group to a spirobisindane moiety and D is selected from: hydrogen, hydroxyl, nitrile, nitro, alkyl, alkoxy, hydroxyalkyl; and carboxylic acid, sulfonic acid and their corresponding salts or esters.

3. The polymer of claim 2 wherein the Troger's base moiety is represented by at least one of Formula Ia and Ib:

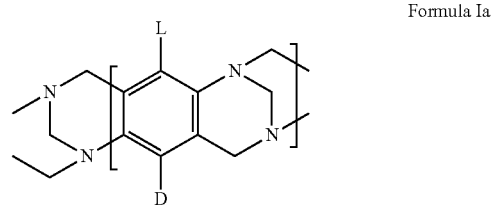

Formula Ia

Formula Ib

4. The polymer of claim 1 wherein the spirobisindane moiety is represented by Formula II:

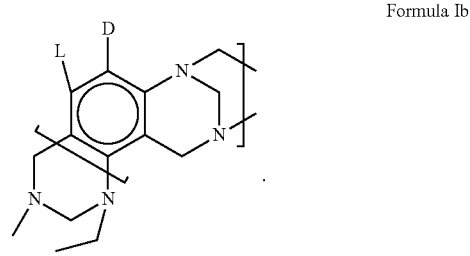

wherein A is independently selected from a fused ring structure including from 1 to 4 rings, or is not present, and L is independently selected from a linking group to a Troger's base moiety.

5. The polymer of claim 4 wherein the spirobisindane moiety is represented by Formula IIa wherein L is independently selected from a linking group to a Troger's base moiety.

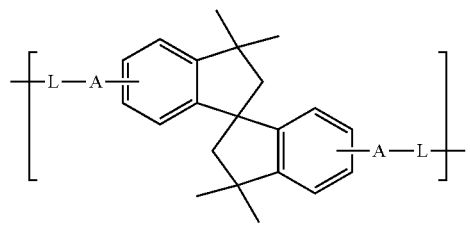

6. The polymer of claim 4 including a sub-unit represented by Formula IV:

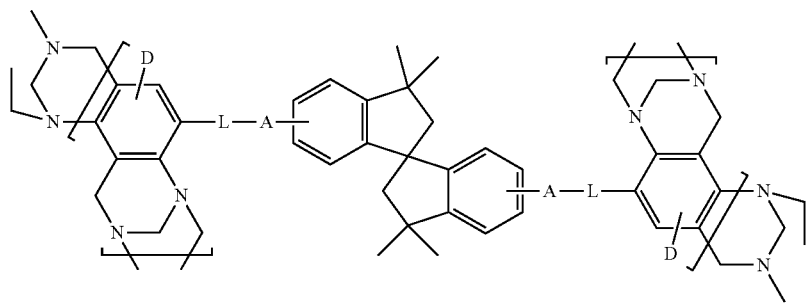

wherein D is selected from: hydrogen, hydroxyl, nitrile, nitro, alkyl, alkoxy, hydroxyalkyl; and carboxylic acid, sulfonic acid and their corresponding salts or esters.

7. The polymer of claim 1 comprising a repeating unit comprising a spirobisindane moiety and Troger's base moiety linked together by way of a linking group (L).

8. The polymer of claim 1 characterized by having an average pore size of from 0.2 to 20 nm as determined by ASTM F316-03 (2011).

9. A membrane comprising the polymer of claim 1.

* * * * *